(No Model.)
C. H. TRUAX.
SURGICAL NEEDLE HOLDER.
No. 439,910. Patented Nov. 4, 1890.
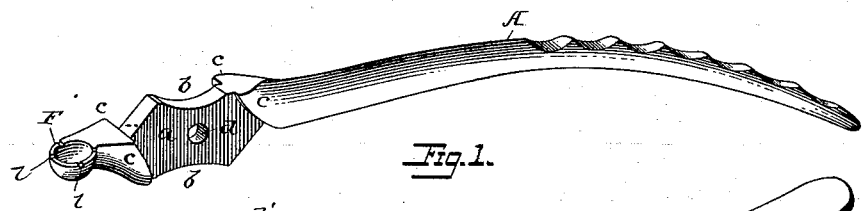
Fig. 1.
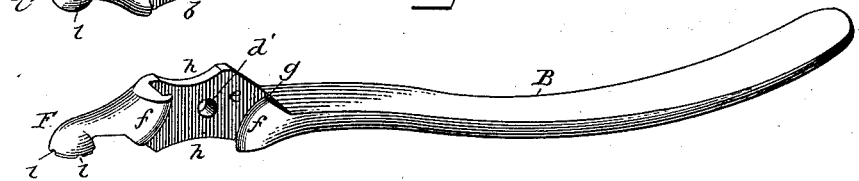
Fig. 2.
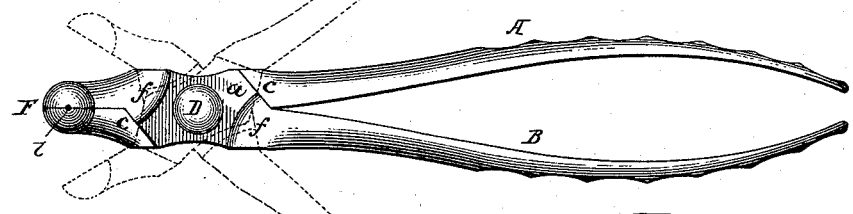
Fig. 6.
Fig. 3.
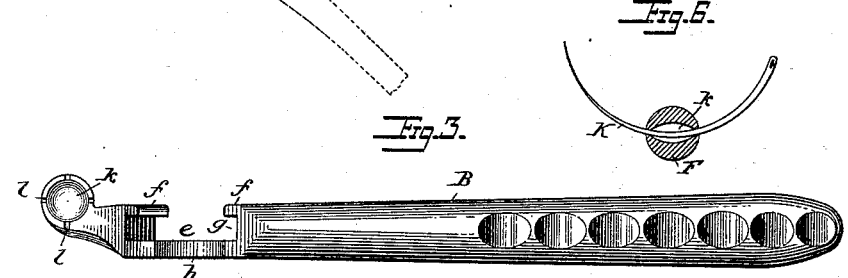
Fig. 4.
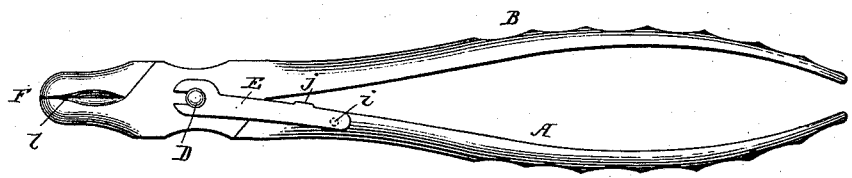
Fig. 5.
WITNESSES
Jno. G. Hinkel
George P. Kramer
INVENTOR
Charles H. Truax
By Porter & Freeman
Attorneys.

UNITED STATES PATENT OFFICE.

CHARLES H. TRUAX, OF CHICAGO, ILLINOIS.

SURGICAL-NEEDLE HOLDER.

SPECIFICATION forming part of Letters Patent No. 439,910, dated November 4, 1890.

Application filed April 4, 1890. Serial No. 346,528. (No model.)

*To all whom it may concern:*

Be it known that I, CHARLES H. TRUAX, a citizen of the United States, residing at Chicago, Cook county, Illinois, have invented certain new and useful Improvements in Surgical Instruments, of which the following is a specification.

My invention relates to surgical instruments, and more particularly to surgeon's needle-holders; and it consists in the construction and arrangement of the parts substantially as pointed out hereinafter in the claims.

Referring to the accompanying drawings, forming part of this specification, Figure 1 is a perspective view of the two handles and their co-operating parts of the forceps or a needle-holder separated. Fig. 2 is a bottom plan view, the parts being pivoted together and shown opened in dotted lines. Fig. 3 is a side view of one of the parts. Fig. 4 is a top plan view. Fig. 5 is a side view of a modification, and Fig. 6 is a sectional view through the needle-holding jaw.

The handles A B may be of any shape, configuration, or have any desired ornamentation on them, and the handle A is formed with a flattened portion $a$, having parallel sides and concaved at its edges $b$, the projecting portions $c$ forming abutments for the complementary portions of the joint. This flattened portion is perforated at $d$ to receive the pivot-pin D, which secures the two parts of the instrument together. The handle B is cut away at its end, forming the portion $e$, and has one or more overhanging or inwardly-projecting portions $f$, so that recesses $g$ are formed in the handle to constitute the box portion of the joint, into which the portion $a$ of the complementary handle is fitted. The edges $h$ are preferably concaved, so as to correspond with the concaved edge $d$ of the complementary portion $a$, and a perforation $d'$ for the reception of the pivoted pin D is also provided, corresponding with the like perforation $d$ in the portion $a$. The parts being thus connected, it will be seen on reference to Fig. 2 that when the two handles are brought together in the position indicated in dotted lines the portion $a$ can readily be passed into the box-shaped recess, the concaved portion $b$ passing freely by the edge or edges of the overhanging lips or flanges $f$, and as soon as the handles are brought toward each other the plate $a$ of the joint will pass under the edges of the overhanging flanges $f$ and the parts will be securely held together. These overhanging flanges operate to maintain the parts in position and in perfect alignment, and prevent any twisting or displacement of the operating portions of the instruments under strain, and the joint is practically complete and sufficiently accurate for many purposes without the pivot-pin, and the parts may be so used when desired, the box-joint being sufficiently accurate to maintain the parts in operative position. When it is desired to separate the parts, it is only necessary to bring them to the position indicated in dotted lines, and the handle A may be withdrawn from the box-shaped joint in the handle B.

Where it is desired to have the joint more accurately and closely maintained, I provide the parts with a pivot-pin D, which passes through the openings $d$ $d'$ in the complementary parts of the joint, and while the pin in some instances may be headed and riveted I preferably provide a removable locking-piece E, which consists of a plate having a bifurcated end adapted to fit in a recess in the stem of the pivot to hold the pivot in position, and having a pin $i$ on its under side adapted to fit a pin-hole in the side of the handle A, and it may further be provided with a lip or projection $j$, fitting the central surface of the handle, so that the locking-piece is securely held in position, but can be readily removed to separate the parts of the forceps.

It will be observed that when the handles are in position and the locking-pin secured as above set forth, they are held together practically at three points, as at the pin and at the overhanging flanges of the joint, and thus they are accurately maintained in parallelism, while allowing freedom of motion to grasp the needle, and further allowing the parts to be readily separated in order that they may be cleansed or asepticized. In Fig. 5 I have shown a modification of this joint, in which the flattened portion $a$ of the handle A is recessed on one side only, as at $a'$ $b'$, and the handle B is provided with a single overhanging lip or flange $f'$, and while this furnishes a box-joint suitable for some purposes it is evident that it is not so perfect and complete a locking-joint as when provided with two overhanging lips, substantially as above indicated. While this form of open box-shaped joint above described is applicable to many instruments, I have shown it applied here to a surgeon's needle-holder, each handle being provided at its end with a jaw F, shown as being practically cylindrical and projecting to one side of the longitudinal axis of the handle. Heretofore these needle-holding jaws have been flat or convex faced, and as the needles are generally curved to a greater or less extent it is evident that they would not contact with the needle throughout their surfaces, but simply at a central and two points on either side of the curved needle, and the result is that when they are pressed together tightly they operate to straighten the needle, and when the needles are highly tempered they are liable to be broken or distorted from their proper curve. To remedy this defect, I make the surfaces of the needle-holder concave, as seen more particularly at $k$, Figs. 3 and 6, so that the needle K is grasped between the jaws at two points, the jaws bearing directly opposite to each other at these points, and the bent portion of the needle between these points extending more or less into the concave portion $k$ of the jaws. In this way the needle may be securely held without danger of distorting or breaking the same, the pressure from both jaws being at directly opposite points of the needle.

The jaws F may be provided with a number of small recesses $l$ on opposite sides to receive the needle and prevent it turning laterally between the jaws, and the jaws being extended to one side permits the needle being held in a position longitudinal to the needle and transversely thereto with equal facility. The jaws, being circular in shape and concaved, as shown, and curving to one side, not only permit the use of the instrument with surgeons' needles, but for many other appliances which need not be recited, as it is evident that the devices used will be firmly grasped and securely held between the jaws in operation and the danger of mutilating them by excessive pressure on the handles is avoided.

I claim—

1. In a surgical instrument, the combination of two handles, one of which is provided with a flattened portion having parallel sides and concave edges and projecting portions, forming abutments, and the other handle having a cut-away portion provided with inwardly-projecting overhanging portions, forming a recess or box for the reception of the flattened portion of the other handle, both handles being united with a detachable pivot-pin, substantially as described.

2. A needle-holding surgical instrument consisting of two handles, pivoted together, each provided with a circular jaw projecting to one side of the longitudinal axis of the handles, substantially as described.

In testimony whereof I have signed my name to this specification in the presence of two subscribing witnesses.

CHARLES H. TRUAX.

Witnesses:
C. W. BAKER,
M. BROWN.